(12) United States Patent
Kaneda et al.

(10) Patent No.: US 6,592,192 B1
(45) Date of Patent: Jul. 15, 2003

(54) BRAKE FLUID PRESSURE CONTROL SYSTEM

(75) Inventors: Ichiro Kaneda, Kanagawa; Kouji Kanauchi, Kawasaki, both of (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/345,490

(22) Filed: Jul. 1, 1999

(30) Foreign Application Priority Data

Jul. 1, 1998 (JP) .......................................... 10-186613

(51) Int. Cl.[7] .................................................. B60T 8/66
(52) U.S. Cl. ...................... 303/156; 303/140; 303/155; 303/191
(58) Field of Search ................................ 303/155, 156, 303/157, 158, 140, DIG. 3, DIG. 4, 141, 113.4

(56) References Cited

U.S. PATENT DOCUMENTS

| 4,962,824 | A | * | 10/1990 | Hagiya et al. ............... 303/156 |
| 5,058,020 | A | * | 10/1991 | Matsuda ...................... 303/156 |
| 5,265,947 | A |   | 11/1993 | Wupper et al. ............. 303/100 |
| 5,335,983 | A |   | 8/1994  | Beck et al. ............... 303/119.2 |
| 5,731,975 | A | * | 3/1998  | Nakashima .................. 303/191 |
| 5,855,420 | A | * | 1/1999  | Lawrence .................... 303/155 |
| 5,876,102 | A |   | 3/1999  | Mori et al. .................. 303/156 |
| 6,012,783 | A | * | 1/2000  | Schwarzer et al. ......... 303/140 |
| 6,014,441 | A | * | 2/2000  | Lloyd et al. ................ 303/156 |

FOREIGN PATENT DOCUMENTS

| DE | 3903 180 A1   | 8/1990 |
| DE | 41 08 028 A1  | 9/1992 |
| DE | 19525538 A1   | 1/1996 |
| DE | 19524952 A1   | 1/1997 |
| JP | 9-95229       | 4/1997 |

* cited by examiner

Primary Examiner—Matthew C. Graham
(74) Attorney, Agent, or Firm—Foley & Lardner

(57) ABSTRACT

In a brake pressure control system for ABS control, traction control or vehicle motion control, a control unit controls each of pressure control solenoid valves in a PWM (pulse width modulation) control mode to prevent pulsation in the wheel cylinder pressure during the presence of a predetermined temperature or pressure condition, and a non-PWM control mode in the absence of the predetermined condition. The control unit includes a process section such as a computer and a PWM switch section including subsections each for a unique one of the solenoid valves. The process section has a single PWM port connected through a PWM signal line to each subsection of the PWM switch section.

16 Claims, 16 Drawing Sheets

| | SIGNAL | HIGH | LOW | CONDITION OF PRESSURE INCREASE SIDE SOLENOID VALVE |
|---|---|---|---|---|
| 1 | SOLENOID SIGNAL | ○ | | ON |
| | PWM SWITCH SIGNAL | | ○ | HOLD STATE |
| 2 | SOLENOID SIGNAL | | ○ | PWM CONTROL |
| | PWM SWITCH SIGNAL | ○ | | |
| 3 | SOLENOID SIGNAL | | ○ | OFF |
| | PWM SWITCH SIGNAL | | ○ | NORMAL ABS CONTROL (WITHOUT PWM CONTROL) PRESSURE INCREASE STATE  NORMAL BRAKING STATE |

| | WHEEL CYLINDER PRESSURE | MASTER CYLINDER PRESSURE | DIFFERENTIAL PRESSURE |
|---|---|---|---|
| ICED ROAD | 0.5~1.5 | 4~5 | P1 = 2.5~P2 = 4.5 |
| PRESSED SNOW ROAD | 2~3 | 5~7 | P1 = 2~P2 = 5 |

BRAKE FLUID PRESSURE CONTROL SYSTEM

BACKGROUND OF THE INVENTION

The present invention relates to a vehicle ABS control for controlling a brake fluid pressure to prevent wheel locking on braking, a vehicle motion control for controlling the brake fluid pressure to prevent unwanted vehicle behavior due to an excessive over-steer condition or an excessive under-steer condition during steering operation, and a vehicle traction control for controlling the brake fluid pressure to optimize the driving forces of the drive wheels during starting operation.

An ABS brake fluid pressure control system in general compares a wheel speed with a pseudo vehicle body speed (approximating the vehicle speed) to determine a slip rate of each wheel. If the slip rate exceeds a predetermined level, the control system starts the ABS control, and controls the fluid pressure applied to the associated wheel cylinder to increase, hold and decrease the brake fluid pressure in a manner to prevent wheel locking.

A brake fluid pressure control system shown in a Japanese Patent Provisional Publication No. 9(1997)-95229 is arranged to prevent pulsation of a wheel cylinder pressure and reduce operating noises by performing, in an ABS control operation, a pulse width (or pulse duration) modulation control (PWM control) based on a duty ratio control to one or more solenoid valves in a brake actuator for varying the brake fluid pressure.

This system uses the PWM control in opening and closing a solenoid valve in the ABS control and varies the duty ratio to effectively reduce pulsation of the wheel cylinder pressure.

Moreover, in consideration of deviation, from a desired correspondence, of an actual correspondence between a PWM-controlled duty ratio and a coil current due to changes in the resistance of the coil or solenoid and the source voltage caused by variation in the temperature, the control system determines a PWM signal $D1'$ by the following equation.

$$D1' = D1 \times 100 \times I0/I'0$$

In this equation, $D1$ is an original PWM signal before correction, $I0$ is a coil current at a duty ratio of 100% in a theoretical relationship between the duty ratio and the coil current, and $I'0$ is a coil current at the duty ratio of 100% in the coil current versus duty ratio characteristic curve, determined by the original PWM signal.

SUMMARY OF THE INVENTION

In the present invention, attention is directed to a relation between an operating condition, such as a coil temperature of a solenoid valve, and reduction of pulsation.

FIG. 17 shows control waveform according to a PWM control. The PWM control includes a T1 pressure increase interval and a T2 pressure increase interval. The T1 pressure increase interval is a short period immediately after the solenoid valve is turned OFF. During this, the PWM control is still inoperative. The T2 pressure increase interval is a period during which the PWM control is operative (the PWM duty ratio is effective). The T1 pressure increase time interval, the T2 pressure increase time interval and the duty ratio are preliminarily determined to achieve a pressure increase quantity equaling a moderate pressure increase quantity in the normal ABS control. If the coil temperature or the ambient temperature varies beyond limits A1 and A2 shown in FIG. 15, then the target current and the amount of the valve lift vary for the same duty ratio, so that the system becomes unable to achieve a desired moderate pressure increase, as shown at A in FIG. 17.

As shown in FIG. 15, a region of good PWM control performance is only part of a region of good normal ABS performance. The normal ABS control mode is a mode in which the PWM control based on the duty ratio control is not performed, and the controller outputs the drive signal simply made up of constant on signal and off signal. In the PWM control mode, by contrast, the drive signal is produced according to the PWM control. In the PWM mode, the control system controls the current supplied to the coil according to the PWM control, and this current is affected by variation in the temperature of the coil, so that the control system cannot achieve a desired moderate pressure increase. Therefore, the performance of the PWM control is satisfactory only in the narrow region shown in FIG. 15, and the performance becomes worse outside the region defined between A1 and A2. The control system may be able to achieve a desired moderate pressure increase by varying the PWM control appropriately when the temperature becomes closer to A1 or A2. This arrangement, however, requires costly microcomputer and complicated control program to continuously vary PWM.

It is therefore an object of the present invention to provide a brake fluid pressure control for reducing cost and preventing undesired pulsation.

According to the present invention, a brake fluid pressure control system comprises a brake actuator, a sensor and a control unit.

The brake actuator comprises at least one solenoid valve for regulating a brake fluid pressure for at least one wheel of a vehicle. The sensor senses a vehicle operating condition. The control unit is for controlling the brake fluid pressure by producing a drive signal to drive the solenoid valve of the actuator in accordance with the vehicle operating condition sensed by the sensor, and for producing, as the drive signal, a PWM control signal according to a pulse width modulation in the case of existence of a predetermined PWM control condition, and a normal control signal comprising an on signal and an off signal in the case of nonexistence of the predetermined PWM control condition.

DETAILED DESCRIPTION OF THE INVENTION

Figure 1:
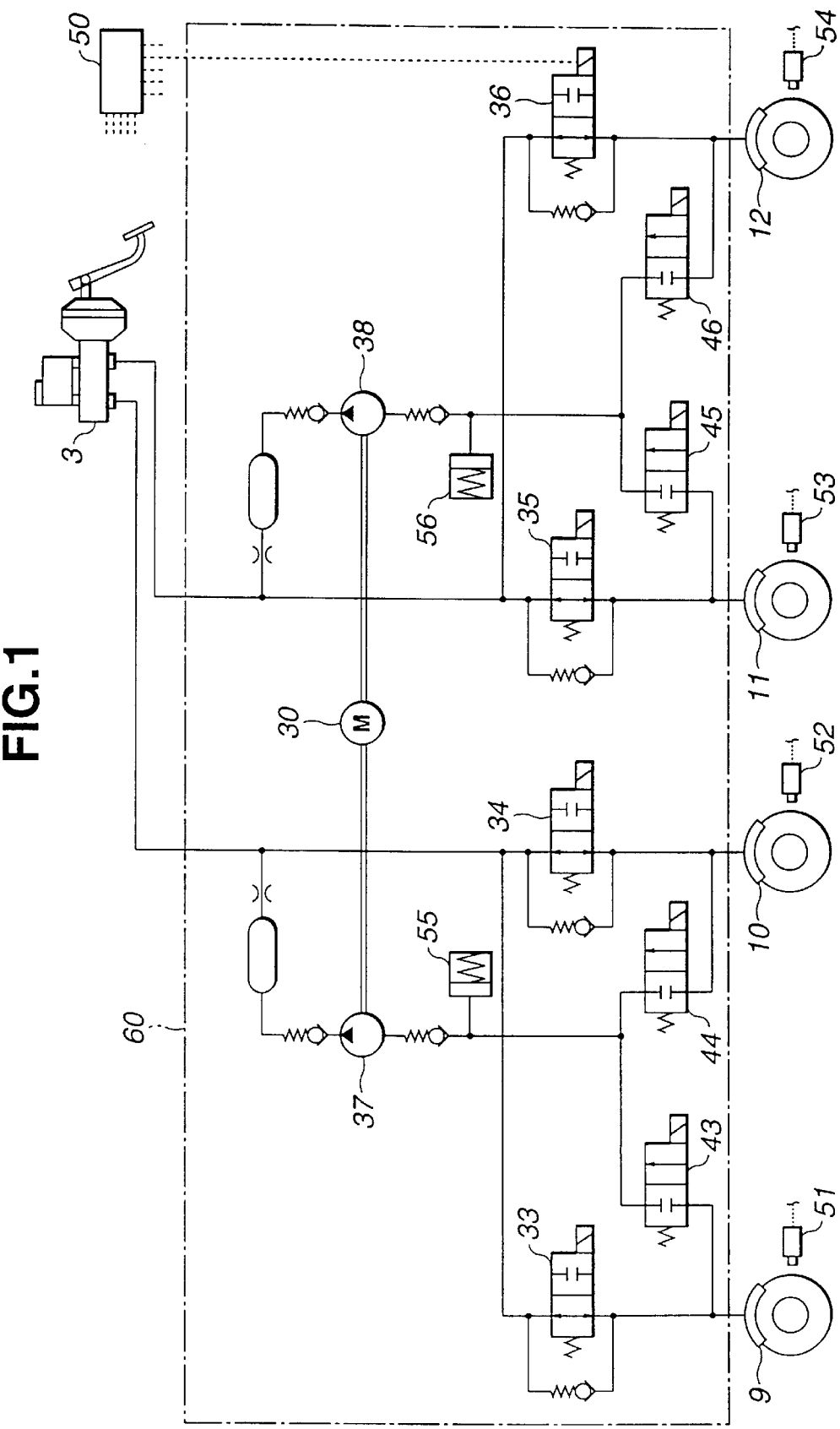
FIG. 1 is a diagram showing a hydraulic circuit of a brake fluid pressure control system according to a first embodiment of the present invention.
Figure 11:
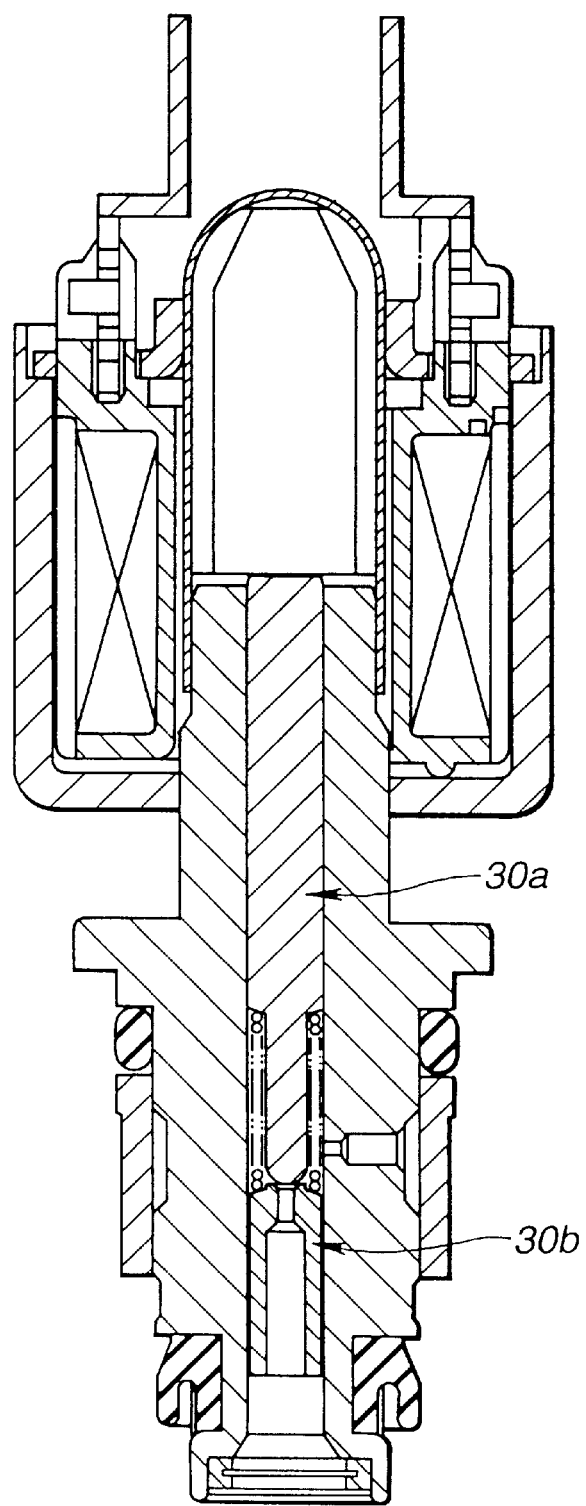
FIG. 11 is a sectional view showing one solenoid valve employed in the control system of FIG. 3.

FIG. 1 shows a hydraulic circuit of a brake fluid pressure control system according to a first embodiment of the present invention. Between a master cylinder 3 and wheel cylinders 9, 10, 11 and 12 for road wheels of a vehicle, there is provided a brake unit 60. The brake unit 60 includes an arrangement of pressure increase side solenoid valves 33, 34, 35 and 36 and pressure decrease side solenoid valves 43, 44, 45 and 46 for increasing, holding and decreasing the oil pressure for each wheel cylinder 9, 10, 11 or 12. The brake unit 60 further includes pumps 37 and 38, driven by a motor 30, for returning, to the master cylinder 3, the oil drained to reservoirs 55 and 56 from the wheel cylinders 9~12 during a pressure decreasing operation. In this example, each of the pressure increase side solenoid valves 33~36 and the pressure decrease side solenoid valves 43~46 is an on-off type solenoid valve, as shown in FIG. 11, having a plunger valve element 30a and a valve seat 30b for allowing and blocking the flow of the brake fluid.

Wheel speed sensors 51, 52, 53 and 54 sense wheel speeds of the road wheels of the vehicle and produce pulse signals representing the sensed wheel speeds, respectively. The wheel speed sensors 51~54 are connected to a control unit 50. In FIG. 1, signal lines for the control unit 50 are partly omitted.

Figure 2:
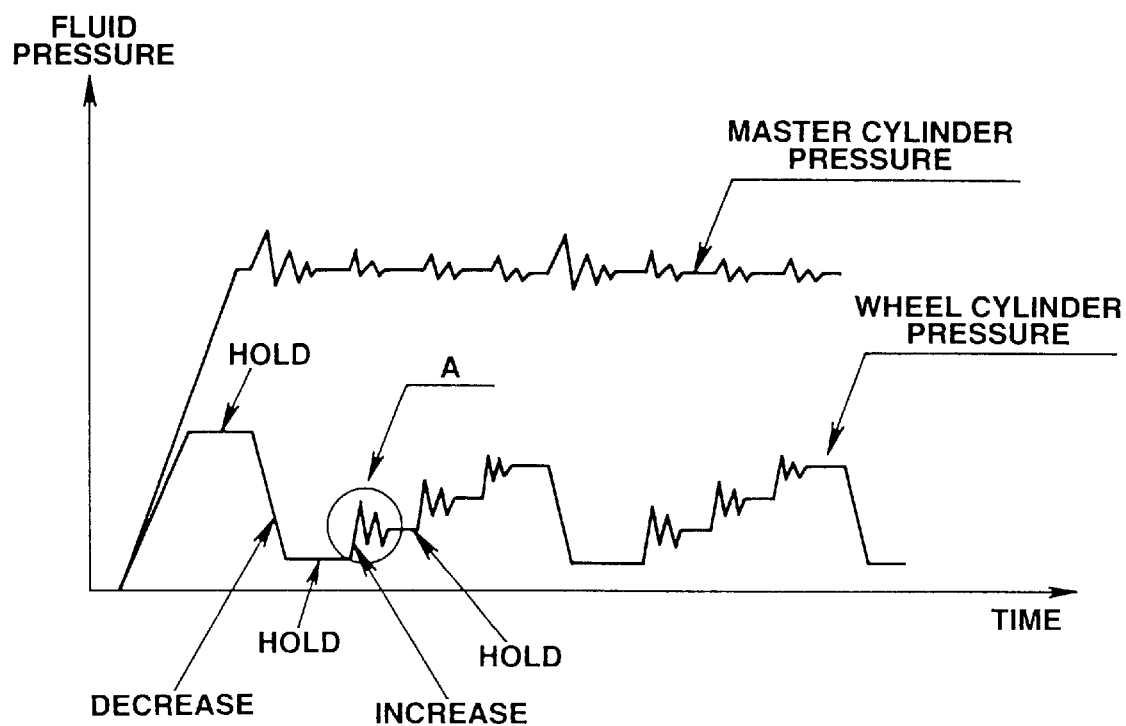
FIG. 2 is a graph illustrating variation in a master cylinder pressure and a wheel cylinder pressure during pressure increase, hold and decrease operations.

FIG. 2 illustrates variation of the master cylinder fluid pressure and wheel cylinder fluid pressure when pressure increasing, holding and decreasing operations are performed. In a section shown as an example by a circle A from a pressure increasing operation to a pressure holding operation, a change from the OFF (deenergized) state increasing the pressure to the ON (energized) state in one or more of the pressure increase solenoid valves 33~36 tends to cause a fluid pressure surge due to violent collision of the plunger valve element against the valve seat. This pressure surge produces pulsation in the fluid passages and fluctuates the wheel cylinder pressure, resulting in variation in the braking force and vibration in the suspension system. The driver can feel this as unpleasant operating sound of the ABS system.

Figure 3:
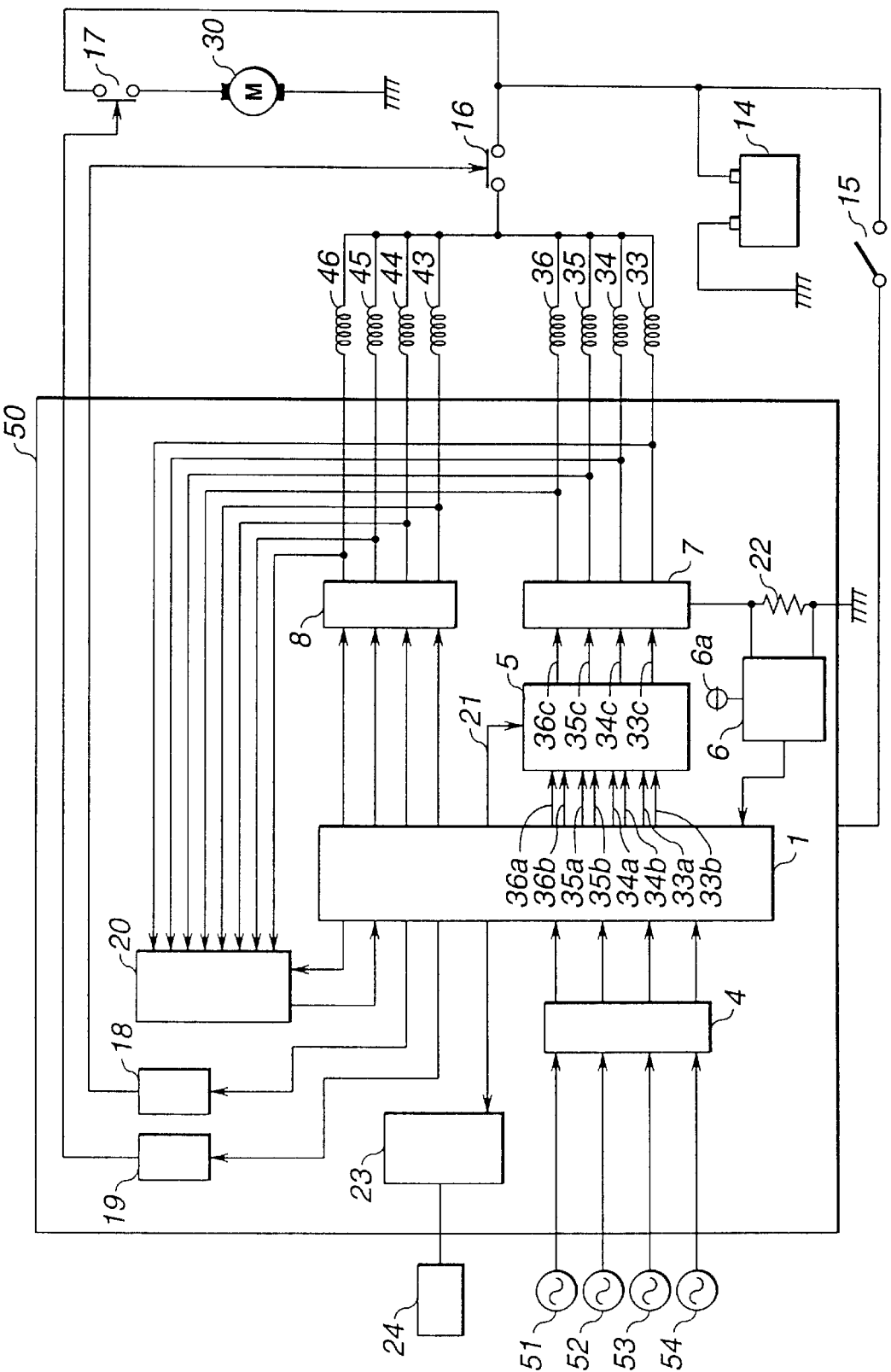
FIG. 3 is a diagram showing the control system according to the first embodiment.

FIG. 3 shows the control system according to the first embodiment of the present invention.

The control unit 50 includes a wheel speed input circuit 4 for processing the signals from the wheel speed sensors 51~54. Signals having processed waveforms are sent from the input circuit 4 to a microcomputer 1.

A PMW signal line 21 is a line through which a PMW signal of a PWM duty ratio with a predetermined frequency is sent from the microcomputer 1 to a PWM circuit 5. Furthermore, there extend, from the microcomputer 1 to the PCM circuit 5, a pair of PWM switch signal line 33a and solenoid signal line 33b for operating the pressure increasing solenoid valve 33, a pair of PWM switch signal line 34a and solenoid signal line 34b for operating the pressure increasing solenoid valve 34, a pair of PWM switch signal line 35a and solenoid signal line 35b for operating the pressure increasing solenoid valve 35, and a pair of PWM switch signal line 36a and solenoid signal line 36b for operating the pressure increasing solenoid valve 36.

The PWM circuit 5 determines the mode of the control signal (the PWM control signal or the normal ABS control signal) to be inputted to each of the pressure increasing solenoid valves 33~36, and sends the signals to an pressure increase side solenoid valve drive circuit 7. The pressure increase side solenoid drive circuit 7 is connected to the pressure increase side solenoid valves 33~36, respectively, and further connected with a resistor circuit having at least one fixed resistor 22. This fixed resistor 22 is connected with an amplifier circuit 6 having a circuit voltage source 6a (of 5 V). The amplifier circuit 6 sends a detection signal to the microcomputer 1. The resistance of the fixed resistor 22 is preliminarily examined at an ordinary temperature at a predetermined voltage.

The circuit shown in FIG. 3 further includes a battery 14, a key switch 15, an actuator relay 16, a motor relay 17, an actuator relay drive circuit 18, a motor relay drive circuit 19, a fail-safe circuit 20, a fault diagnostic circuit 23 and an external diagnosis connector 24. It is optional to provide at least the fail-safe circuit 20 and the diagnostic circuit 23 in the microcomputer 1.

Figures 4, 5:
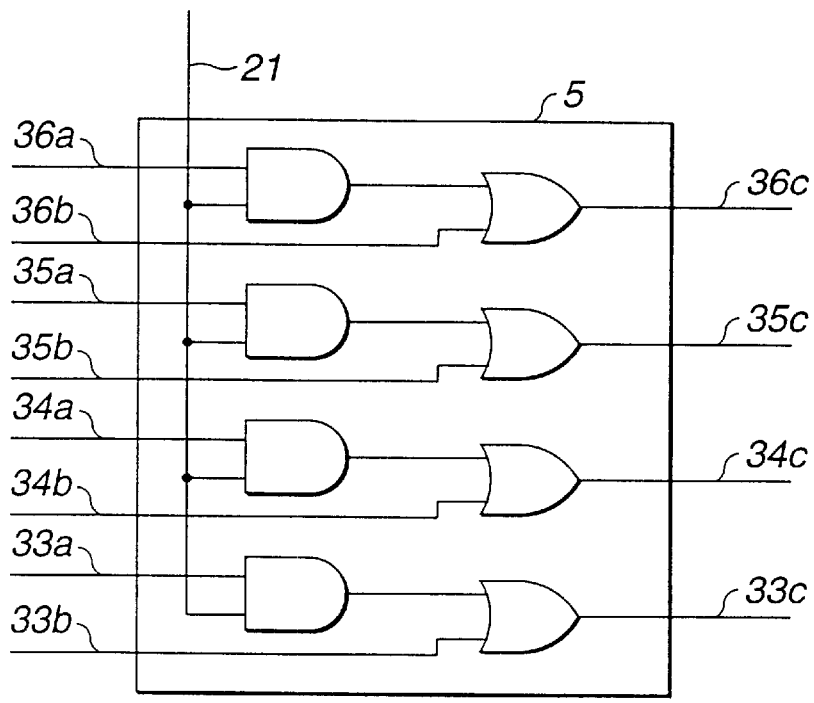
FIG. 4 is a diagram showing a PWM circuit 5 shown in FIG. 3.
FIG. 5 is a table showing input and output states of the PWM circuit.

FIG. 4 shows the PWM circuit 5 more in detail. The PWM circuit 5 has four circuit sections for delivering controls signals, respectively, through four output lines 33c, 34c, 35c and 36c to the pressure increase side solenoid valves 33~36. The four circuit sections are substantially identical to one another. The PWM signal is inputted to each section through the PWM signal line 21. The first circuit section, as an example, further receives the solenoid signal through the solenoid signal line 33b and the PWM switch signal through the PWM switch signal line 33a, and delivers the output signal through the output signal line 33c. When the first solenoid signal line 33b is High, the first PWM circuit section delivers, through the first output signal line 33c to the first pressure increase side solenoid valve 33, the output signal in the normal ABS ON state (the hold state without the PWM control). When the solenoid signal line 33b is Low and the PWM switch signal line 33a is High, the first PWM circuit section delivers the output signal in the form of the PWM control signal to the first increase side solenoid valve 33. When the solenoid signal line 33b is Low and the PWM switch signal line 33a is Low, then the first PWM circuit section delivers the output signal in the OFF state to the first pressure increase side solenoid valve 33. Input and output conditions in these three operating states are listed in FIG. 5. The second, third and fourth PWM circuit sections are operated in the same manner. In the example shown in FIG.

4, each PWM circuit section includes an AND subsection having a first input receiving the PWM signal through the line 21, a second input receiving the switch signal through the line 33a~36a, and an output, and an OR subsection having a first input connected with the output of the AND subsection, a second input receiving the solenoid signal through the line 33b~36b and an output for delivering the output signal through the line 33c~36c.

Figure 6:
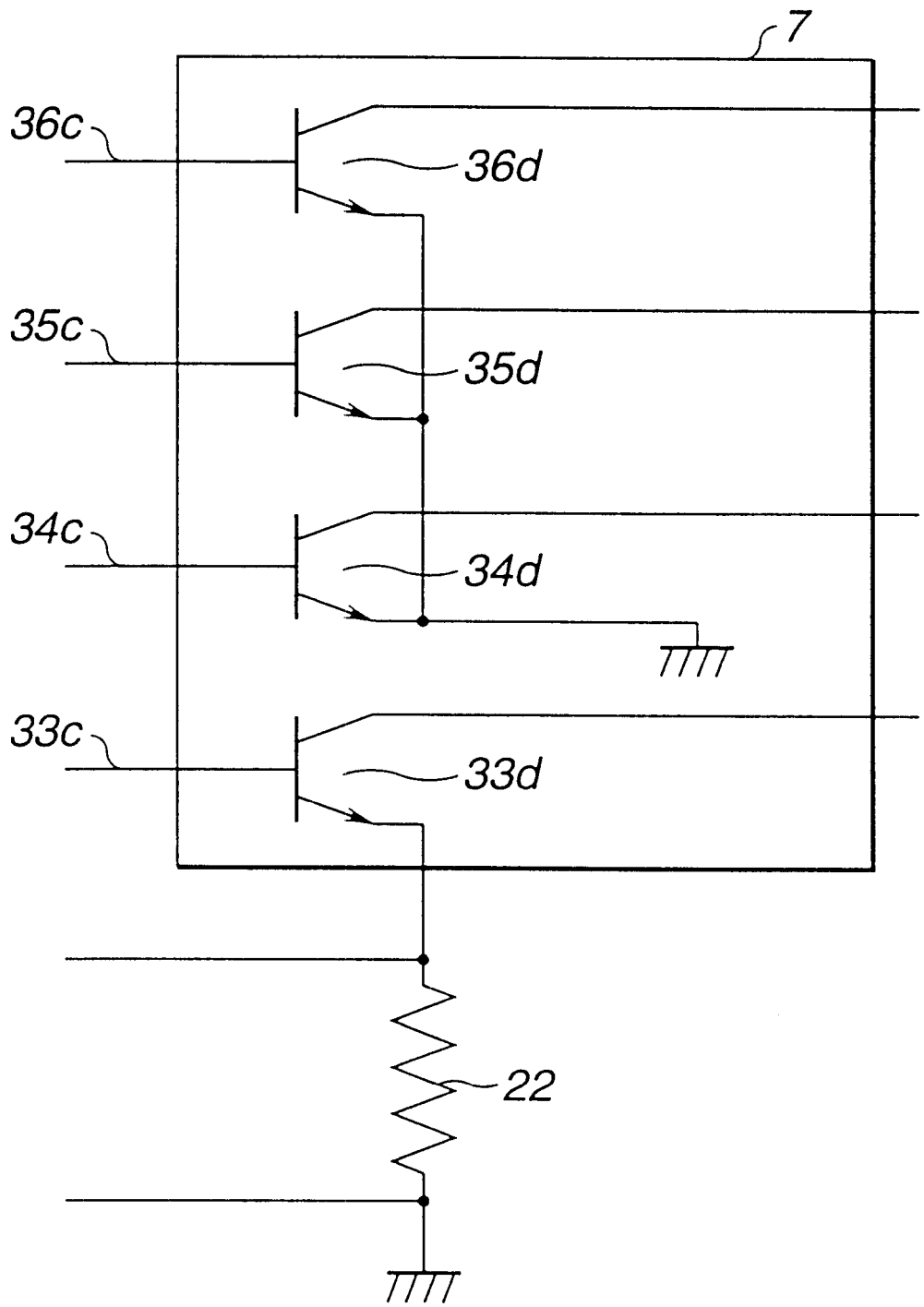
FIG. 6 is a diagram showing a pressure increase side solenoid valve drive circuit 7 shown in FIG. 3.

FIG. 6 shows the pressure increase side solenoid valve drive circuit 7 in detail. The output signal lines 33c~36c from the PCW circuit 5 are connected, respectively, to drive devices (or drive elements) 33d, 34d, 35d and 36d for driving the pressure increase side solenoid valves 33~36. In this example, the fixed resistor 22 is connected between the drive device 33d and a ground. In the example depicted in FIG. 6, each drive device is a transistor having a control terminal (such as a base electrode) connected with the corresponding output signal line 33c~36c, a first terminal (such as a collector electrode) connected to the corresponding solenoid valve, and a second terminal (such as an emitter electrode) grounded (through the fixed resistor 22 in the case of the first drive device 33d).

Figure 7:
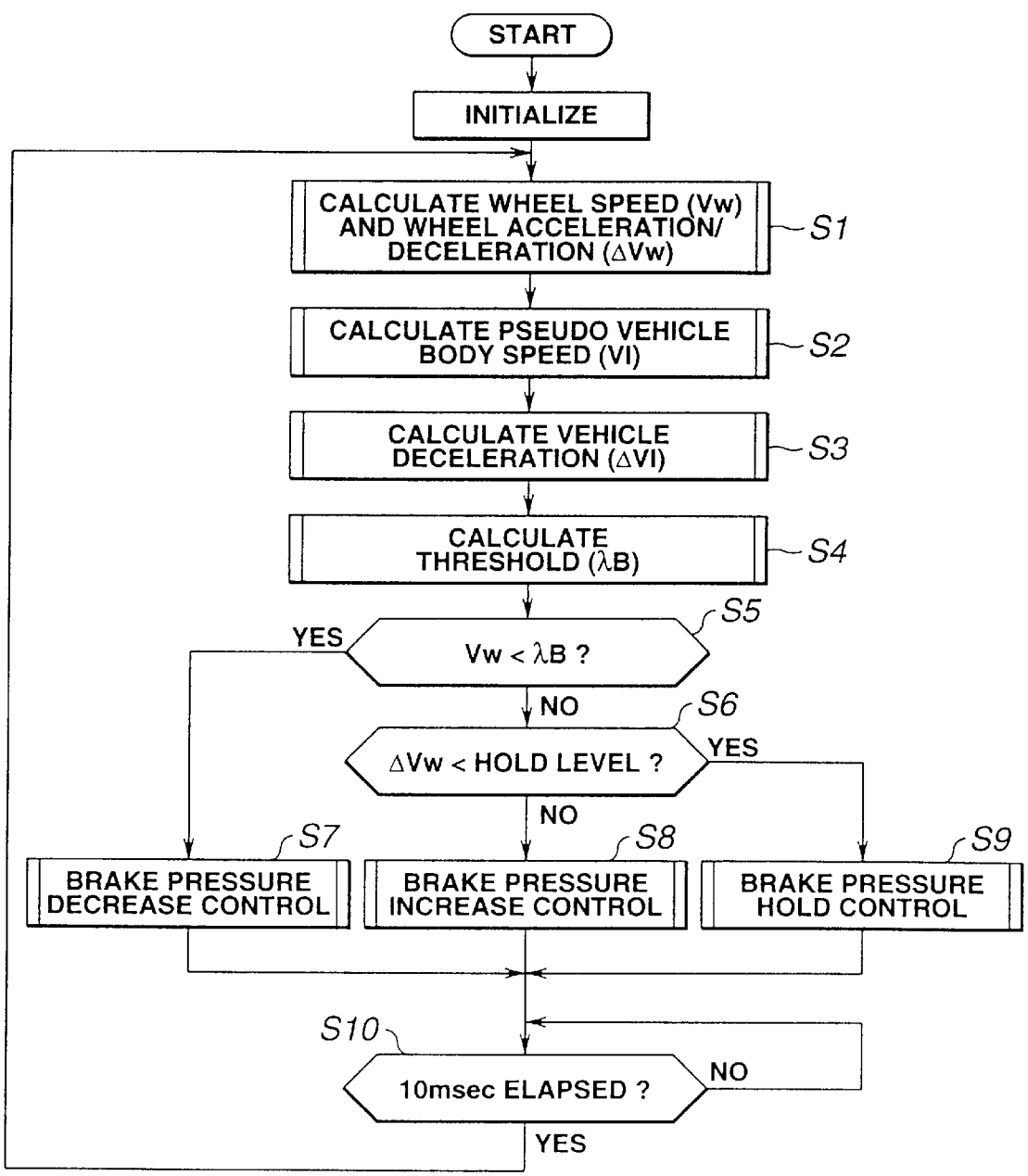
FIG. 7 is a flowchart showing a basic ABS control process performed in the control system of FIG. 3.

FIG. 7 is a flowchart showing a basic flow of the ABS control process performed by a cycle of 10 msec. After a an initialization following a start of this control process, a step S1 is reached. At the step S1, the control unit 50 (or the microcomputer 1 of the control unit 50) calculates the wheel speed Vw of each wheel by determining the sensor signal frequency from the number of pulses and period of the sensor signal from the corresponding one of the wheel speed sensors 51~54, and further calculates a wheel acceleration/deceleration ΔVw of each wheel. The wheel acceleration/deceleration ΔVw is a time rate of change of the wheel speed. In this example, the wheel acceleration/deceleration ΔVw is an amount of change of the wheel speed Vw during a predetermined time interval.

At a step S2 following the step S1, a pseudo vehicle body speed VI is determined by a select-high operation of changes in the wheel speeds Vw, or from a longitudinal acceleration sensed by a longitudinal acceleration sensor. A next step S3 is for determining a vehicle deceleration ΔVI from current and previous values of the pseudo body speed VI. A step S4 is for determining a pressure decrease threshold λB for use in the ABS control.

Then, the wheel speed of each wheel is checked and the brake fluid pressure for each wheel is controlled in the following manner. At a step S5 following the step SS4, the control unit 50 checks whether the wheel speed Vw of each wheel is lower than the threshold λB. If Vw<λB, the control unit 50 proceeds to a step S7 for a pressure decrease operation. If Vw≧λB, the control unit 50 proceeds to a step S6 to further check whether the wheel acceleration/deceleration ΔVw is lower than a predetermined hold level. If ΔVw<the hold level, the control unit 50 proceeds to a step S9 for a pressure hold operation. If ΔVw≧the hold level, the control unit 50 proceeds to a step S8 for a pressure increase operation. Thereafter, the control unit 50 checks at a step S10 whether 10 msec has elapsed. After the elapse of 10 msec, the control unit 10 returns to the step S1.

Figure 8:
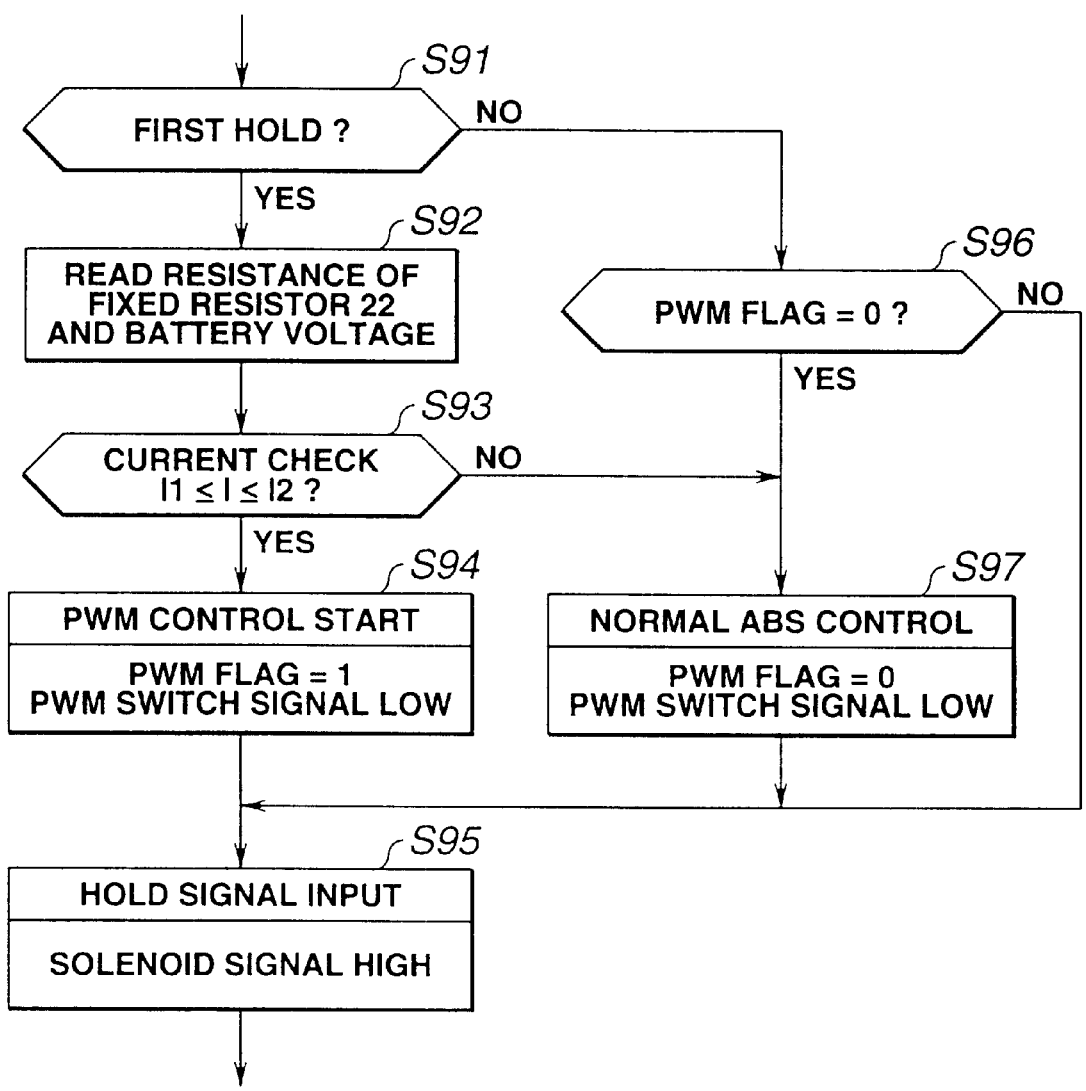
FIG. 8 is a flowchart showing a brake fluid pressure hold control employed in the process of FIG. 7.

FIG. 8 shows the brake fluid pressure hold control of the step S9 in detail. First at a step S91, the control unit 50 checks whether this operation is the first hold operation after the start of the ABS control. The control unit 50 proceeds to a step S92 in the case of the first hold operation, and to a step S96 in the case of a second or subsequent hold operation.

At the step S92, the control unit 50 reads the resistance value of the fixed resistor 22 and the battery voltage. Then, at a step S93, the control unit 50 determines the value I of a current flowing through the fixed resistor 22, and checks the current I. From the step S93, the control unit 50 proceeds to a step S94 if I1≦I≦I2, and to a step S97 if I<I1 or I2<I. The step S93 is for deciding whether to perform the PWM control by checking the current I through the fixed resistor 22. The current values I1 and I2 are limit values for defining a region in which the PWM control is carried out.

At the step S94, the control unit 50 starts the PWM control, sets a PWM flag to one, and sets the PWM switch signal to Low (the low state). At a next step S95, a hold signal is inputted, and the solenoid signal is set to High (the high state).

At the step S96 reached from the step S91 in the case of a second or subsequent hold operation, the control unit 50 checks the PWM flag, and proceeds to the step S97 if the PWM flag is zero and to the step S95 if the PWM flag=1.

At the step S97, the control unit 50 performs the normal ABS control, resets the PWM flag to zero, and sets the PWM switch signal to Low.

In this brake fluid pressure hold control of the step S9, either of the flow from S94 to S95 and the flow from S97 to S95 sets the PWM signal to Low and the solenoid signal to High, and the corresponding one of the pressure increase side solenoid valves 33~36 operates in the hold state.

Figure 9:
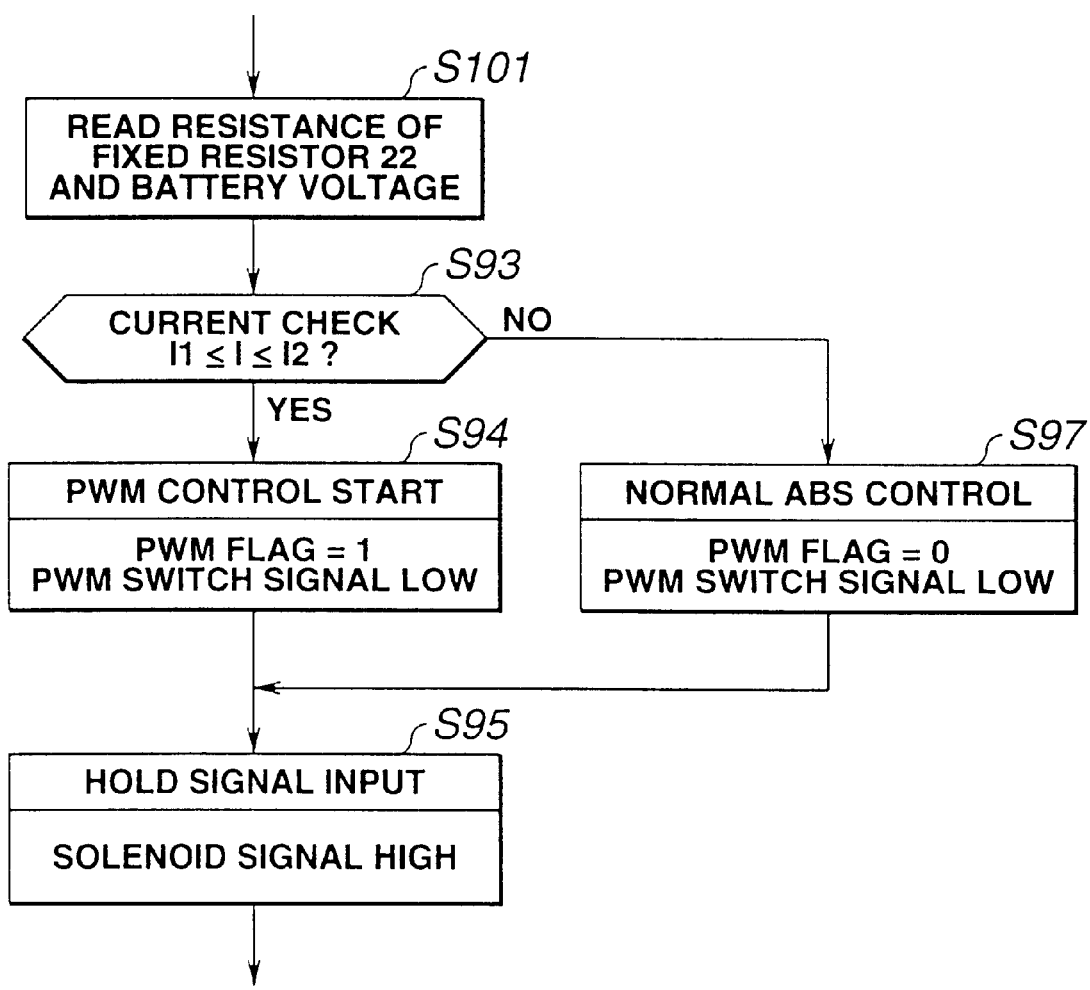
FIG. 9 is a flowchart showing another example of the brake fluid pressure hold control the control system of FIG. 3 can employ instead of the flow of FIG. 8.

FIG. 9 shows another example of the pressure hold control of the step S9. Steps S93, S94, S95 and S97 are substantially identical to the corresponding steps of FIG. 8.

In the example of FIG. 9 unlike FIG. 8, the resistance value of the fixed resistor 22 and the battery voltage are read at a step S101 irrespective of whether the first hold operation or not. This configuration can switch precisely the control mode during the ABS control between the mode with the PWM control and the mode without the PWM control, and thereby achieve both reduction of operating noise and satisfactory ABS performance.

Figure 10:
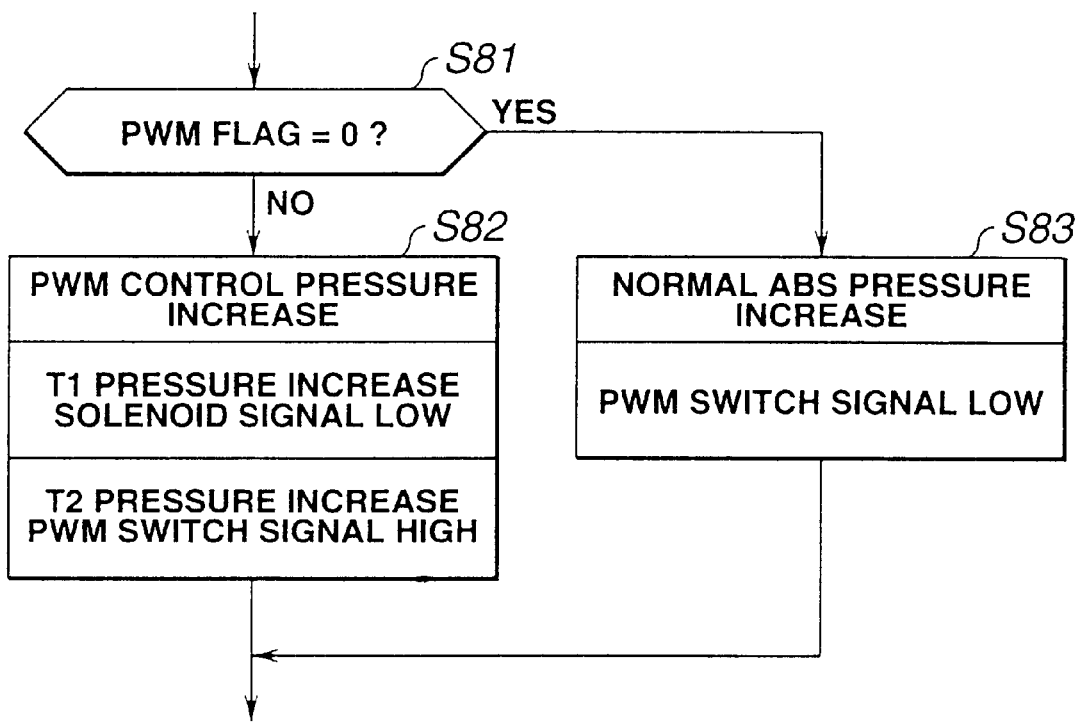
FIG. 10 is a flowchart showing a brake fluid pressure increase control employed in the process of FIG. 7.

FIG. 10 shows the brake fluid pressure increase control of the step S8 shown in FIG. 7.

At a step S81, the control unit 50 examines whether the PWM flag is equal to zero, and proceeds to a step S82 to perform a PWM control mode pressure increase operation if the PWM flag is not equal to zero. At the step S82, the control unit 50 first sets the solenoid signal to Low for the T1 pressure increase, and then sets the PWM signal to High for the T2 pressure increase. If the PWM flag is equal to zero, the control unit 50 proceeds from the step S81 to a step S83. At the step S83, the control unit 50 performs a normal ABS pressure increase operation and sets the PWM switch signal to Low. The PWM flag is reset to zero in the initializing section shown in FIG. 7 or at the end of the ABS control.

In the first embodiment, as shown in FIG. 3, there is provided only one of the PWM signal port, connected with the PWM signal line 21, for outputting the PWM signal based on the duty ratio. The microcomputer 1 is configured to deliver the PMW signal of a single duty ratio from this single port. There is no need for the control for continuously varying the PWM, so that an uncostly computer can be used as the microcomputer 1.

Figures 15, 16:
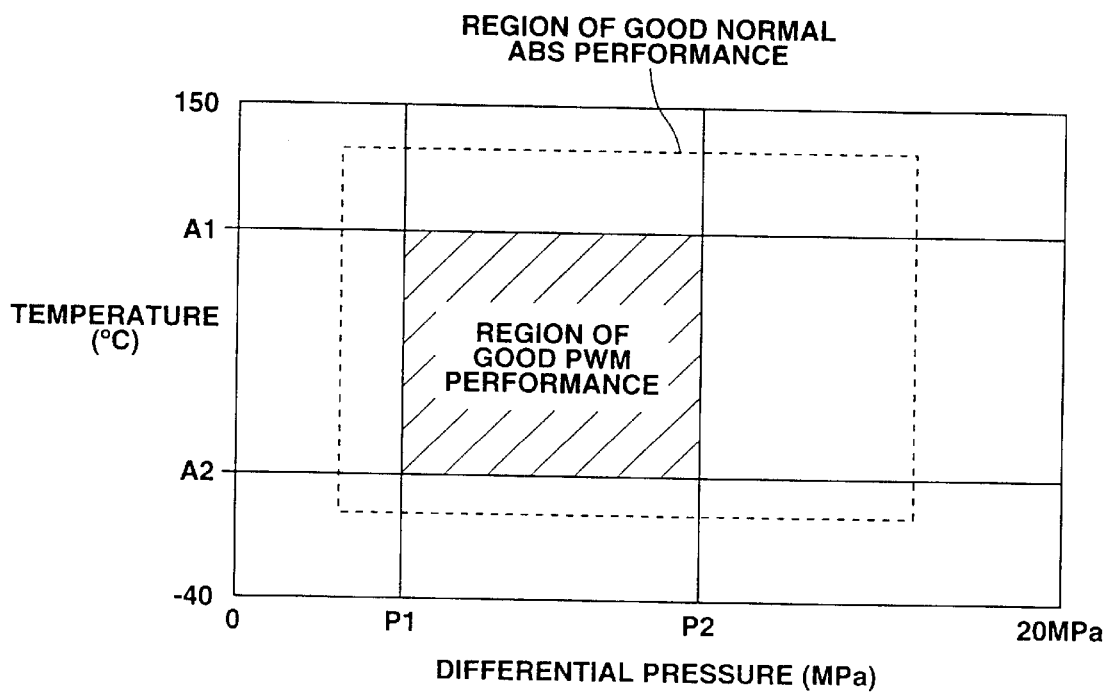
FIG. 15 is a graph showing a PWM control region according to the embodiments of the present invention.
FIG. 16 is a table showing a relationship between a road surface condition and a differential pressure between the master cylinder pressure and wheel cylinder pressure.
Figure 17:
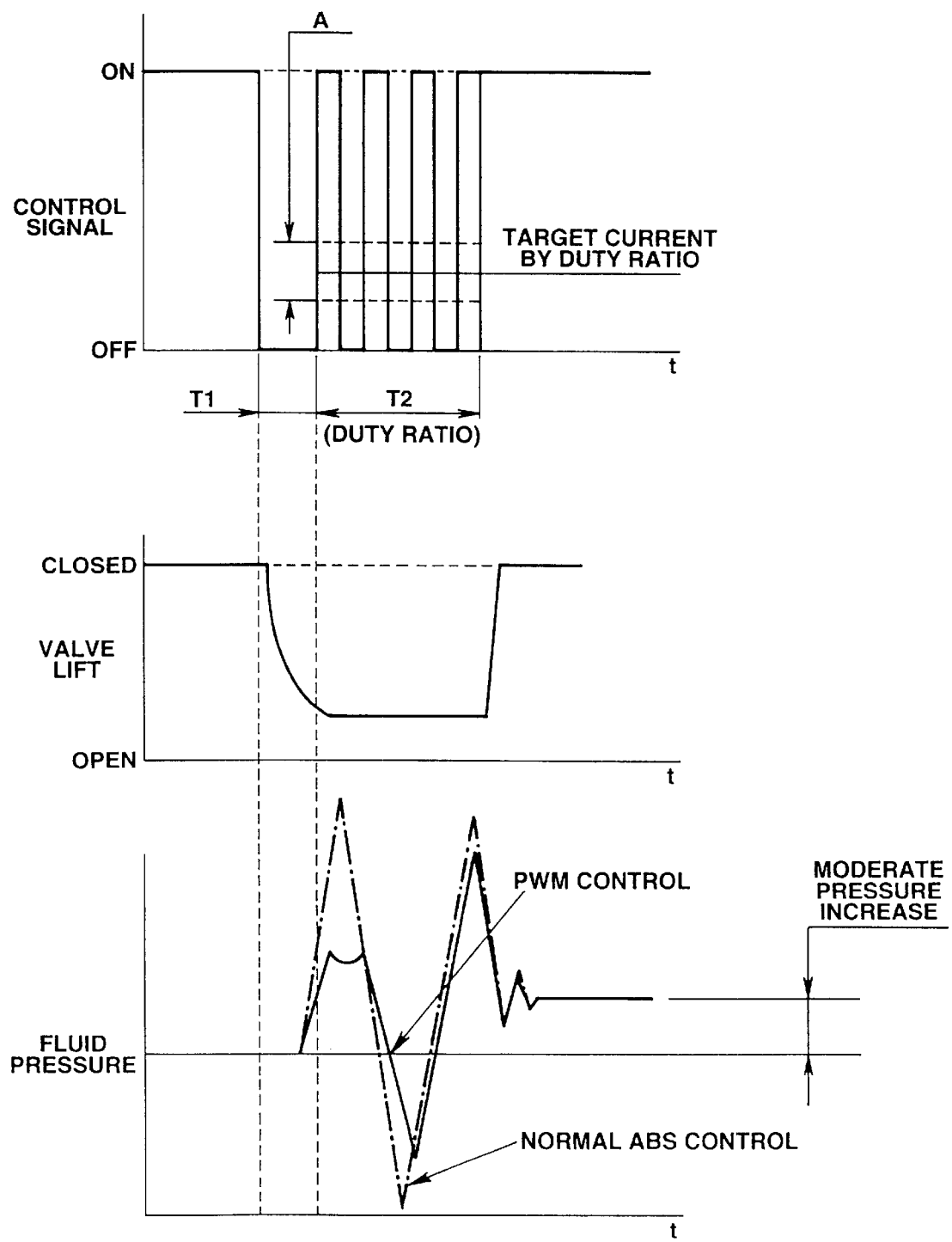
FIG. 17 is a graph showing the PWM control.

Despite the simplified arrangement for producing only one PWM signal, the control system according to this embodiment carries out the PWM control only in the region as shown in FIG. 15 where the PWM control is sufficiently effective in preventing pulsation and reducing noises and vibrations. The PWM control is not performed outside this effective region. Therefore, the control system can reduce pulsation, noises and vibrations sufficiently without performing the continuous control for continuously controlling the PWM in accordance with the temperature.

Figure 12:
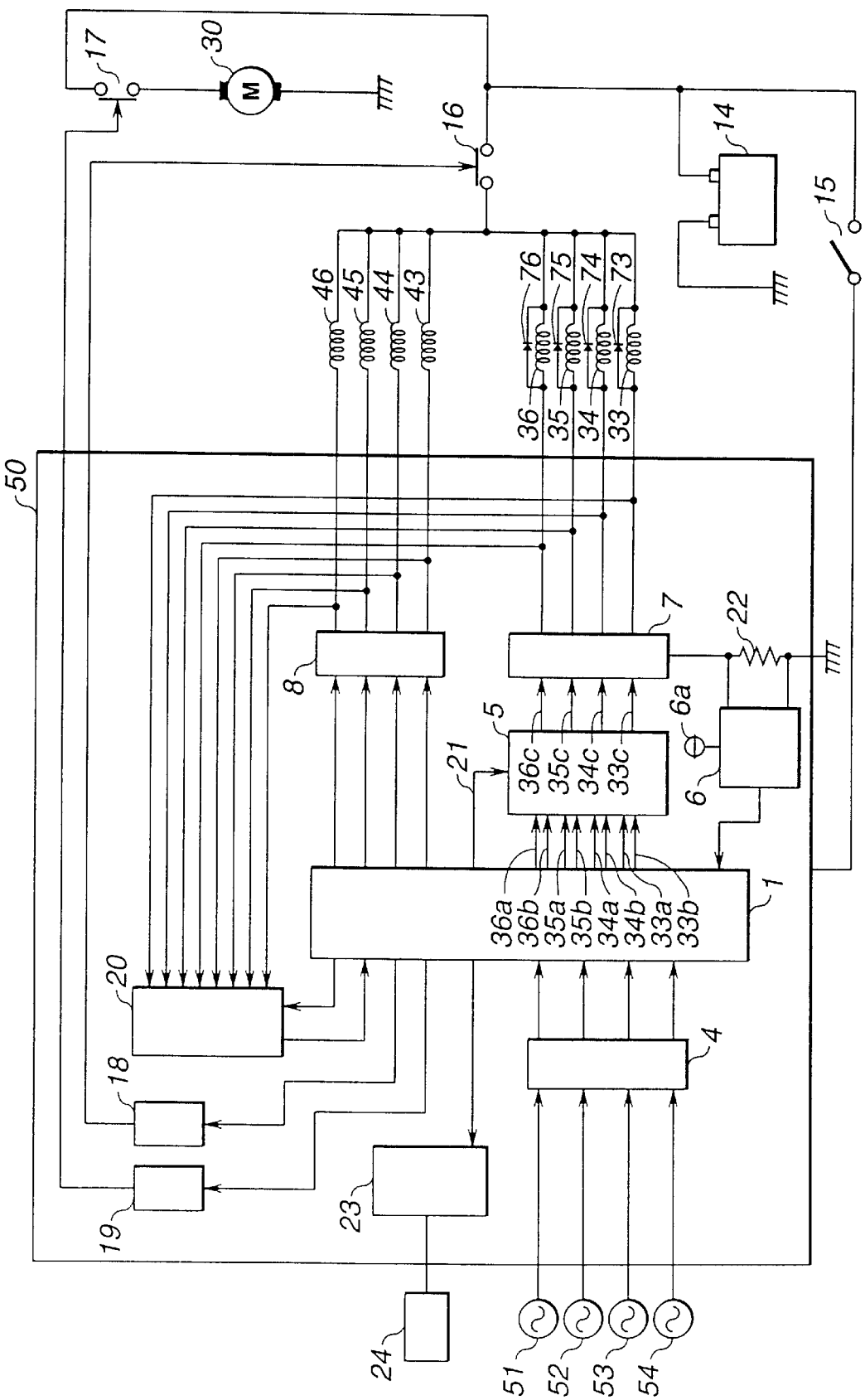
FIG. 12 is a diagram showing a brake fluid control system according to a second embodiment of the present invention.

FIG. 12 shows a brake fluid pressure control system according to a second embodiment of the present invention. In this control system, there are provided flywheel circuits 73, 74, 75 and 76 each of which is connected in parallel to the coil of a unique one of the pressure increase side solenoid valves 33~36. The flywheel circuits 73~76 function to reduce the occurrence of counter electromotive force in an ON to Off transition in the solenoid valves 33~36. As a result, the control system according to the second embodiment can improve the accuracy in the PWM control (improve the ability of controlling the current value accurately to the desired value, that is). In other respects, the control system of FIG. 12 is substantially identical to the system of FIG. 3. Each flywheel circuit includes a diode as shown in FIG. 12.

Figure 13:
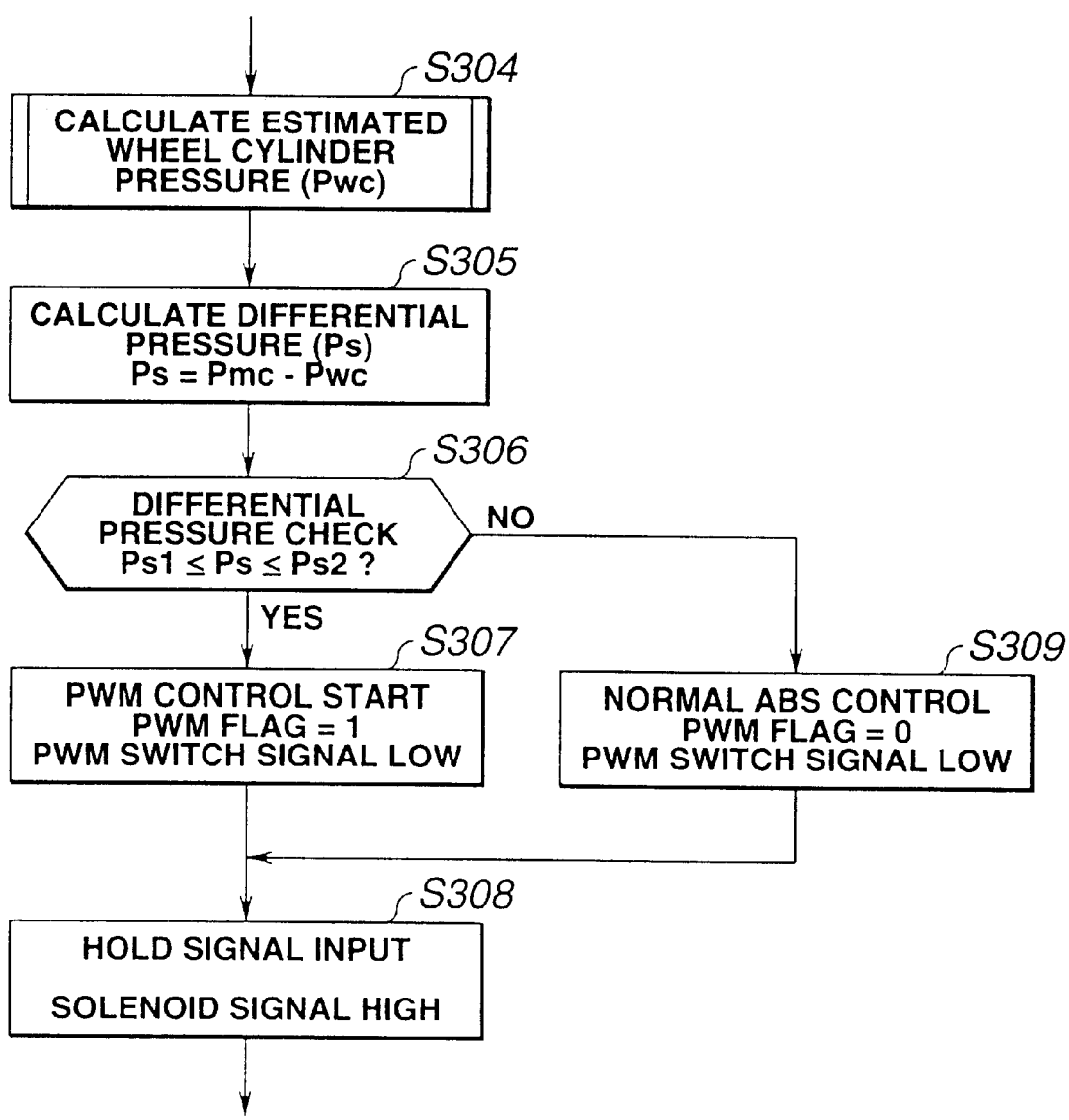
FIG. 13 is a flowchart showing a brake fluid pressure hold control according to a third embodiment of the present invention.
Figure 14:
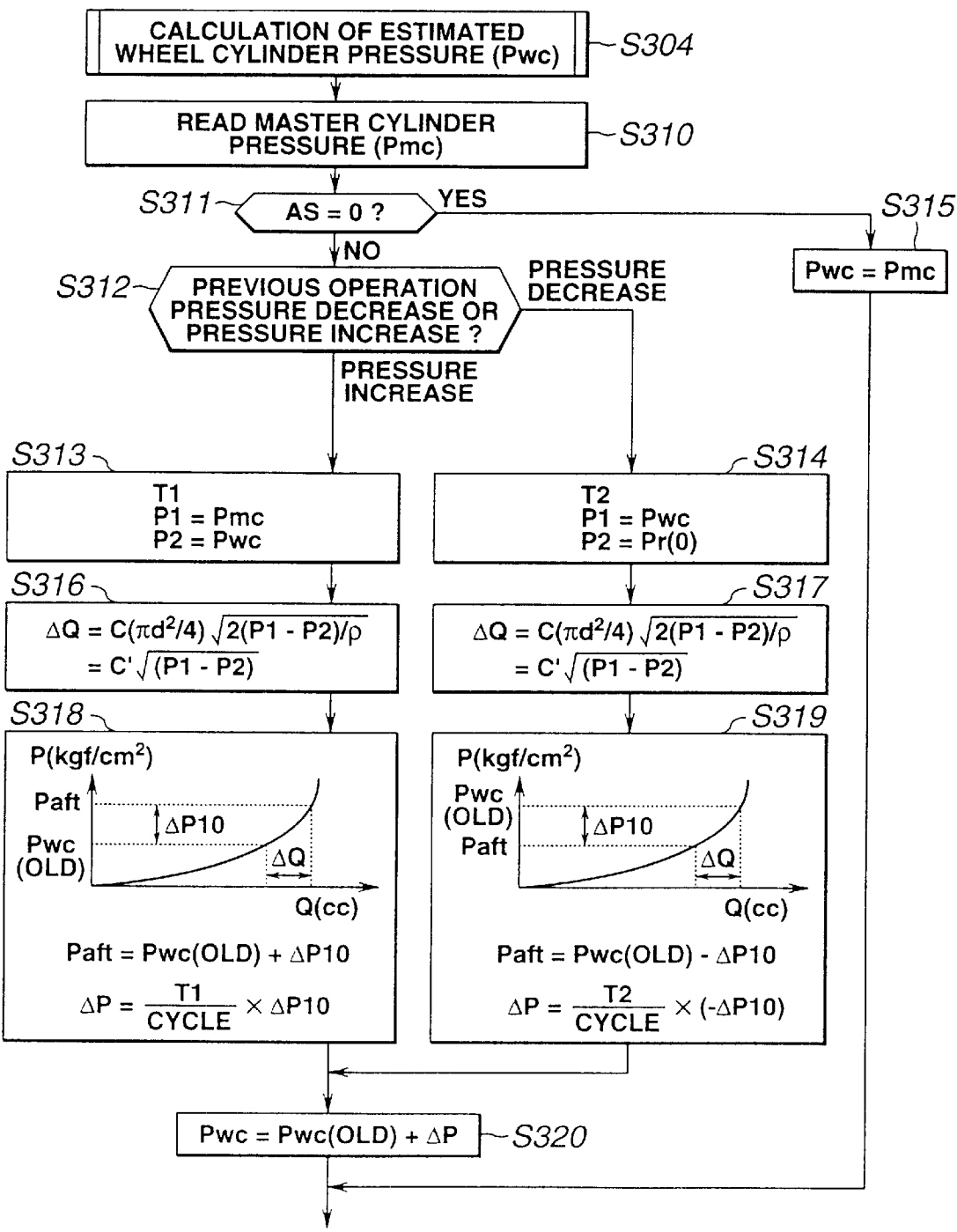
FIG. 14 is a flowchart showing a process for estimating a wheel cylinder pressure, employed in a control system according to the third embodiment.

FIGS. 13 and 14 show a control process performed by a brake pressure control system according to a third embodiment of the present invention. In the third embodiment, the control system is arranged to monitor a differential pressure (or pressure difference) between the fluid pressure of the master cylinder 3 and the fluid pressure in each of the wheel cylinders 9~12, instead of the temperature (or the current I of the fixed resistor 22), to switch the control mode in the brake pressure hold control in the step S9 between the modes with and without PWM.

As the results of investigation, the inventors of the present application has gained knowledge that the PWM control is influenced by the differential pressure between the master cylinder pressure and wheel cylinder pressure as well as the temperature of the solenoid. When the differential pressure is greater than a predetermined pressure, solenoid valves tend to be inaccurate and insufficient for intended control target and prevention of pulsation. When the differential pressure is smaller than a predetermined pressure, solenoid valves of some types could be inaccurate and deficient for the PWM control.

FIG. 15 shows a PWM control region in which satisfactory PWM control performance can be expected. In this example, the PWM control region is bounded between a lower limit pressure P1 and an upper limit pressure P2 and between an upper limit temperature A1 and a lower limit temperature A2. When the differential pressure becomes greater than the upper limit pressure P2 in hard braking, it is difficult to accurately control the valve opening degree to the desired opening degree by controlling the control current with the PWM control, so that the suppression of undesired pulsation is insufficient. FIG. 16 is a table showing numerical examples of the pressure range of P1~P2, obtained by experiments of the inventors. FIG. 16 shows values of the master cylinder pressure and wheel cylinder pressure in braking on a road covered with ice and a road covered with pressed snow. As known from these figures, the reduction of noises and vibrations is demanded only in a limited region.

As shown in FIG. 13, the control unit 50 calculates an estimated wheel cylinder pressure Pwc at a step S304, and then calculates the differential pressure Ps (=Pmc−Pwc) between the master cylinder pressure Pmc and the wheel cylinder pressure Pwc at a step S305. At a step S306 following the step S305, the control unit 50 checks the differential pressure Ps to determine whether Ps is within a range between a predetermined first pressure Ps1 and a predetermined second pressure Ps2. From the step S306, the control unit 50 proceeds to a step S307 if Ps1≦Ps≦Ps2, and to a step S309 if Ps<Ps1 or Ps>Ps2. The pressures Ps1 and Ps2 serve as lower and upper limits, such as P1 and P2, for defining the region of satisfactory PWM performance.

At the step S307, the control unit 50 starts the PWM control, sets the PWM flag to one, and sets the PWM switch signal to Low. At a next step S308, the solenoid signal is set to High. At the step S309, the control unit 50 resets the PWM flag to zero, sets the PWM switch signal to Low, and then proceeds to the step S308.

FIG. 14 shows the estimation of the wheel cylinder pressure Pwc in the step S304.

At a step S310, the control unit 50 reads the master cylinder pressure Pmc sensed by a master cylinder pressure sensor. At a step S311, the control unit 50 checks the ABS control by examining whether AS=0. The control unit 50 proceeds to a step S315 if AS=0, and to a step S312 if As=1.

At the step S312, the control unit 50 examines whether the previous control operation is a pressure decreasing operation or a pressure increasing operation, and proceeds to a step S313 in the case of the pressure increasing operation, and to a step S314 in the case of the pressure decreasing operation.

At the step S313, the control unit 50 determines the pressure increase time (time length) T1 of the previous operation from stored data on the time T1. (The pressure increase time T1 is equal to T1+T2 when the previous increase operation is an increase in the PWM control mode.) Furthermore, the control unit 50 sets the current master cylinder pressure Pmc as P1, and the estimated wheel cylinder pressure Pwc as P2. Then, at a step S316, the control unit 50 calculates a per-unit-time inflow quantity (rate) ΔQ according to the following equation (1). The per-unit-time inflow quantity ΔQ is an amount of fluid flowing into the corresponding wheel cylinder (9~12) per unit time (10 msec) by the current differential pressure. In the pressure increase operation, the brake fluid flows into the wheel cylinder (9~12) by the differential pressure between the pressure Pmc of the master cylinder 3 as the pressure source and the pressure of the wheel cylinder. Therefore, the control unit 50 can calculate the amount of flow during a predetermined unit time interval from the current differential pressure between the master cylinder and the (estimated) wheel cylinder.

$$\Delta Q = C(\pi d^2/4)[(2/\rho)(P1-P2)^{1/2}] \quad (1)$$
$$= C'(P1-P2)^{1/2}$$

In this equation, C is a flow coefficient, d is an orifice diameter and ρ is the density of the brake fluid. The orifice diameter is synonymous with the opening size or opening area of the pressure increase side solenoid valve (33~36). When the opening areas are different among the solenoid valves 33~36, the orifice diameter d differ among the solenoid valves 33~36. The quantity of the fluid flow from the master cylinder 3 to each wheel cylinder WC through the corresponding one of the solenoid valves 33~36 is dependent on the pressure difference between the master cylinder pressure Pmc and the wheel cylinder pressure Pwc, and the quantity of the flow increases as the pressure difference increases. Therefore, the flow quantity ΔQ in this example is a function of the differential pressure (P1−P2), as expressed by the equation (1).

At a next step S318, the control unit 50 calculates a per-unit-time pressure increase quantity ΔP1O per unit time, from the per-unit-time flow quantity ΔQ and the previous estimated wheel cylinder pressure Pwc(old) by using a characteristic between the wheel cylinder pressure and the fluid flow quantity which is determined experimentally and stored as data. According to this characteristic, the control unit 50 calculates a wheel cylinder pressure Paft resulting from the inflow of the quantity ΔQ into the wheel cylinder having the estimated wheel cylinder pressure Pwc(old). Then, the pressure increase quantity ΔP10 is determined from the difference between Paft and Pwc(old) as shown in the step S318. If the driver decreases the brake pedal depressing force during the ABS control, then the master cylinder pressure Pmc becomes lower than the wheel cylinder pressure Pwc, so that the inflow quantity ΔQ becomes negative, and hence the pressure increase quantity ΔP10 becomes negative too. Then, the control unit 50 determines a pressure increase quantity ΔP by multiplying ΔP10 by a quotient obtained by dividing the pressure increase time T1 by the control cycle (10 msec).

ΔP={T1/control cycle (10 msec)}×ΔP10.

Then, at a next step S320, the current estimated wheel cylinder pressure Pwc is determined from the previous estimated wheel cylinder pressure Pwc(old) and ΔP. Pwc=Pwc(previous)+ΔP.

The step S314 is reached from the step S312 when the previous control operation is a pressure decrease operation. At the step S314, the control unit 50 determines the pressure decrease time (length) T2 of the previous operation from stored data on the time T2. Furthermore, the control unit 50 sets the estimated wheel cylinder pressure Pwc as P1, and a reservoir fluid pressure as P2. In this example, the reservoir fluid pressure P2 is equal to a predetermined value which is equal to 0 Kgf/cm².

Then, at a step S317, the control unit 50 calculates the per-unit-time fluid flow quantity ΔQ according to the before-mentioned equation (1). The per-unit-time flow quantity ΔQ is an amount of flow into or out of the wheel cylinder per unit time (10 msec) by the current differential pressure. In the pressure decrease operation, the brake fluid flows out of the wheel cylinder (9~12) by the differential pressure between the wheel cylinder pressure Pwc and the reservoir pressure Pr of the reservoir 55 or 56. Therefore, the control unit 50 can calculate the amount of flow during a predetermined unit time interval from the current differential pressure.

The orifice diameter d is synonymous with the opening size or opening area of the outflow control solenoid valve (43~46). When the opening areas are different among the solenoid valves 43~46, the orifice diameter d differ among the solenoid valves 43~46. The quantity of the fluid flow in the pressure decrease operation from each of the wheel cylinders 9~12 to the reservoir 55 or 56 through the corresponding one of the solenoid valves 43~46 is dependent on the pressure difference between the wheel cylinder pressure Pwc and the reservoir pressure Pr. Therefore, the per-unit-time outflow quantity ΔQ in this example is the function of the differential pressure (P1−P2), as expressed by the equation (1).

At a next step S319, the control unit 50 calculates a per-unit-time pressure decrease quantity ΔP10 per unit time, from the per-unit-time outflow quantity ΔQ determined at the step 317 and the previous estimated wheel cylinder pressure Pwc(old) by using a characteristic between the wheel cylinder pressure and the flow quantity which is determined experimentally and stored as data. In this example, the same characteristic between the wheel cylinder pressure and flow quantity is used both in the steps S318 and S319. According to this characteristic, the control unit 50 calculates a wheel cylinder pressure Paft resulting from the outflow of the quantity ΔQ from the wheel cylinder having the estimated wheel cylinder pressure Pwc(old). Then, the per-unit-time pressure decrease quantity ΔP10 is determined from the difference between Paft and Pwc(old) as shown in the step S319. Then, the control unit 50 determines a pressure decrease quantity ΔP by multiplying ΔP10 by T2 over the control cycle.

ΔP={T2/control cycle (10 msec)}×ΔP10.

Then, at the step S320, the current estimated wheel cylinder pressure Pwc is determined from the previous estimated wheel cylinder pressure Pwc(old) and ΔP. Pwc=Pwc(old)+ΔP.

By performing the PWM control only in the region as shown in FIG. 15 where the PWM control is sufficiently effective in preventing pulsation and reducing noises and vibrations, the control system according to the third embodiment can achieve the intended effects by using the computer 1 of a simple construction. In the present invention, it is possible to employ the first and third embodiments independently and individually, or employ both of the first and third embodiments in combination.

It is possible to use a fluid pressure sensor for sensing the wheel cylinder pressure of each wheel cylinder. The above-mentioned estimation of the wheel cylinder pressure can eliminate the need for such fluid pressure sensors.

The present invention is not limited to the illustrated embodiments. Various variations and modifications are possible in the present invention.

The present invention is applicable to a brake fluid pressure control system for a vehicle traction control for preventing drive wheel slip or acceleration slip or a vehicle motion control system for producing a yaw moment of the vehicle by controlling braking forces applied on wheels to restrain excessive oversteering or understeering during cornering operation in accordance with a vehicle running condition sensed by vehicle motion sensors such as wheel speed sensors, longitudinal acceleration sensor, lateral acceleration sensor, steering angle sensor, a yaw sensor and a yaw rate sensor.

Figure 18:
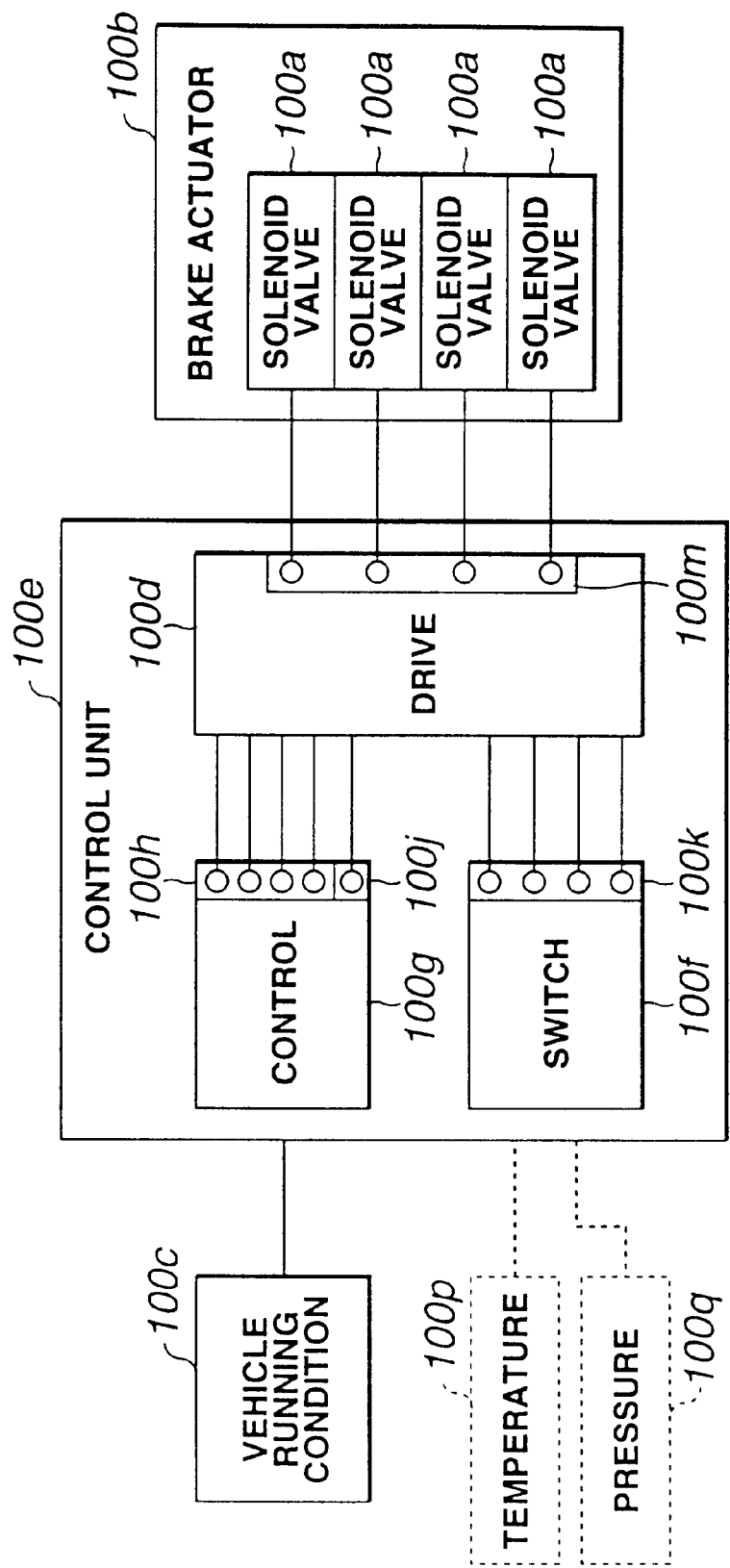
FIG. 18 is a schematic view showing one possible structure of a control system according to the present invention.

FIG. 18 schematically shows one possible structure of a control system according to the present invention. This control system includes an output section 100b having a brake actuator or modulator unit such as the item 60 shown in FIG. 1, an input section for collecting input information on vehicle operating conditions needed for the control, and a control unit 100e. The brake actuator unit of the output section 100b includes a plurality of solenoid valves 100a such as the solenoid valves 33~36 and 43~45 for regulating brake fluid pressure. The input section includes at least one vehicle operating condition sensor 100c (such as the wheel speed sensors 51~54) for sensing a vehicle operating condition needed for the ABS control, or traction control or vehicle behavior (or motion) control. The input section may further includes a sensor or element 100p for sensing the temperature of a solenoid of at least one solenoid valve, and/or a pressure sensor 100q for sensing the master cylinder pressure and/or wheel cylinder pressures. The control unit may includes a drive section 100d, a switch or switching section 100f, and a control section 100g. The control section g includes two or more normal signal ports (or terminals) 100h which is equal in number to the solenoid valves 100a, and only one PWM signal port 100j. The switch section 100f includes two or more switch signal ports 100k which are equal in number to the normal signal ports 100h. The drive section 100d includes two or more output ports or terminal 100m which are equal in number to the solenoid valves 100a, and input ports for receiving signals from the ports of the control section 100g and the switch section 100f. In the example of FIG. 18, the number of the solenoid valves 100a is four, and the number of the input ports of the drive section 100d is nine.

In the third embodiment, the characteristic between the wheel cylinder pressure and the fluid flow quantity used in the step S319 is the same as the characteristic used in the step S318. In the preceding embodiments, PWM signal transmitted through the PWM signal line has a single duty ratio which is fixed at a determined constant value.

What is claimed is:

1. A brake fluid pressure control process for controlling a brake fluid pressure with a solenoid valve, the control process comprising:

a valve condition discriminating step of checking an operating condition of the solenoid valve and producing a PWM permission signal when the operating condition of the solenoid valve is in a predetermined region allowing a pulse width modulation control, the operating condition of the solenoid valve being the temperature of a coil of the solenoid valve; and a mode switching step of switching a brake pressure control mode to a PWM mode of the pulse width modulation control when the PWM permission signal is present, and to a non-PWM mode when the PWM permission signal is absent.

2. The brake fluid pressure control process as claimed in claim 1 wherein the control process further comprises a vehicle condition discriminating step of monitoring a vehicle running condition and producing a pressure decrease command signal to command a fluid pressure decreasing operation, a pressure increase command signal to command a fluid pressure increasing operation, and a pressure hold command signal to command a fluid pressure holding operation, the valve condition discriminating step is performed in response to the pressure hold command signal, and the control process further comprises a pressure increasing step of increasing the fluid pressure in response to the pressure increase command signal according to the PWM mode when the permission signal is present and the non-PWM mode when the permission signal is absent.

3. A brake fluid pressure control system comprising:

a brake actuator comprising a solenoid valve for regulating a brake fluid pressure for a wheel of a vehicle;

a sensor for sensing a vehicle operating condition; and a control unit for controlling the brake fluid pressure by producing a drive signal to drive signal to drive the solenoid valve of the actuator in accordance with the vehicle operating condition sensed by the sensor, and for producing, as the drive signal, a PWM control signal according to a pulse width modulation in the case of existence of a predetermined PWM control condition, and a normal control signal comprising an on signal and an off signal in the case of nonexistence of the predetermined PWM control condition;

wherein the control unit comprises a drive section for delivering the drive signal to the solenoid valve, and a switching section for causing the driver section to deliver the PWM signal when the PWM control condition is present, and to deliver the normal signal when the PWM condition is absent; and wherein the actuator comprises a plurality of said solenoid valves, the control unit further comprises a control section comprising a plurality of normal signal ports for outputting signals for producing a plurality of aid normal control signals, and a PWM signal port for outputting a signal for producing the PWM signal with a single duty ratio, the number of the normal signal ports of the control section is equal to the number of the solenoid valves in the actuator, the switching section comprises switch signal ports for outputting switch signals, the number of the switch signal ports is equal to the number of the normal signal ports, the drive section comprises a plurality of output ports, the number of the output ports is equal to the number of the solenoid valves, and the drive section is arranged to change over the output signal from each output port between the normal control signal and the PWM control signal, in accordance with signal conditions of the normal signal ports, the PWM signal port and the switch signal ports.

4. A brake fluid pressure control system comprising:

a brake actuator comprising a solenoid valve for regulating a brake fluid pressure for a wheel of a vehicle;

a sensor for sensing a vehicle operating condition; and a control unit for controlling the brake fluid pressure by producing a drive signal to drive signal to drive the solenoid valve of the actuator in accordance with the vehicle operating condition sensed by the sensor, and for producing, as the drive signal, a PWM control signal according to a pulse width modulation in the case of existence of a predetermined PWM control condition, and a normal control signal comprising an on signal and an off signal in the case of nonexistence of the predetermined PWM control condition; and wherein the control unit is configured to produce a PWM condition signal representing the existence of the PWM control condition when the temperature of a coil of the solenoid valve in the actuator is in a predetermines temperature region.

5. The brake fluid pressure control system as claimed in claim 4 wherein the control system comprises means for sensing the temperature of the coil of the solenoid valve.

6. The brake fluid pressure control system as claimed in claim 5 wherein the temperature sensing means comprises a circuit component for sensing a current supplied to the solenoid valve of the actuator to determine the temperature from the current.

7. The brake fluid pressure control system as claimed in claim 4 wherein the actuator further comprises a flywheel circuit connected in parallel with a coil of the solenoid valve.

8. The brake fluid pressure control system as claimed in claim 4 wherein the control unit is configured to detect a wheel slip condition and to perform an ABS control to prevent wheel slip.

9. The brake fluid pressure control system as claimed in claim 4 wherein the control unit is configured to perform one of a vehicle traction control for preventing drive wheel slip and a vehicle motion control for controlling a yawing motion of the vehicle by controlling the brake fluid pressure.

10. A brake fluid pressure control system comprising:

a brake actuator comprising a solenoid valve for regulating a brake fluid pressure for a wheel of a vehicle;

a sensor for sensing a vehicle operating condition; and a control unit for controlling the brake fluid pressure by producing a drive signal to drive signal to drive the solenoid valve of the actuator in accordance with the vehicle operating condition sensed by the sensor, and for producing, as the drive signal, a PWM control signal according to a pulse width modulation in the case of existence of a predetermined PWM control condition, and a normal control signal comprising an on signal and an off signal in the case of nonexistence of the predetermined PWM control condition; wherein the control unit is configured to produce a PWM condition signal representing the existence of the PWM control condition when the temperature of a coil of the solenoid valve in the actuator is in a predetermined temperature region; and wherein the control unit is configured to produce a PWM condition signal representing the existence of the PWM control condition when a differential pressure between a master cylinder pressure and a wheel cylinder pressure is in a predetermined region.

11. The brake fluid pressure control system as claimed in claim 10 wherein the control unit determines a current estimated wheel cylinder pressure for use as the wheel cylinder pressure to determine the differential pressure, in accordance with the master cylinder pressure, a pressure varying time of a previous pressure varying operation and a previous estimated wheel cylinder pressure.

12. The brake fluid pressure control system as claimed in claim 10 wherein the control unit is configured to determine a per-unit-time brake fluid flow quantity from the previous estimated wheel cylinder pressure and a primary fluid pressure which is one of the master cylinder pressure and a reservoir pressure, to determine a per-unit-time pressure variation from the per-unit-time flow quantity according to a predetermined characteristic between a wheel cylinder pressure and a flow quantity, and to determine the current estimated wheel cylinder pressure in accordance with the per-unit-time pressure variation and the pressure varying time which is one of a pressure increasing time and a pressure decreasing time, and wherein the control system further comprises a pressure sensor for sensing the master cylinder pressure and supplying data on the master cylinder pressure to the control unit.

13. A brake fluid pressure control apparatus comprising:
a drive section comprising a first drive subsection for delivering a first solenoid drive signal to control a first brake fluid pressure control solenoid valve for varying a brake actuating force applied on a first wheel of a vehicle, and a second drive subsection for delivering a second solenoid drive signal to control a second pressure control solenoid valve for varying a brake actuating force applied on a second wheel of the vehicle;
a PWM section comprising a first PWM subsection including first, second and third input ports and an output port connected to the first drive subsection, and a second PWM subsection including first, second and third input ports and an output port connected to the second drive subsection; and
a process section for putting each of the PWM subsections in one of a PWM control mode and a non-PWM control mode by changing input conditions of the input ports of the PWM subsection, the process section comprising first and second normal signal ports connected, respectively, with the first input ports of the first and second PWM subsections through first and second normal signal lines, first and second switch signal ports connected, respectively, with the second input ports of the first and second PWM subsections through first and second switch signal lines, and a PWM signal port connected with the third input ports of the first and second PWM subsections through a PWM signal line.

14. The brake fluid pressure control apparatus as claimed in claim 13 wherein the process section comprises a digital computer for putting each PWM subsection in the PWM control mode by delivering, through the corresponding one of the normal signal lines, a normal signal in a low-indicative signal state and delivering, through the corresponding one of the switch signal lines, a PWM switch signal in a high-indicative signal state, and in the non-PWM control mode by delivering, through the corresponding one of the normal signal lines, the normal signal in the low-indicative signal state and delivering, through the corresponding one of the switch signal line, the PWM switch signal in the low-indicative signal state.

15. The brake fluid pressure control apparatus as claimed in claim 13 wherein the process section monitors an operating parameter affecting an operating characteristic of each solenoid valve, produces a PWM permission signal for permitting a PWM control when the operating parameter is in a predetermined range, and putting each PWM subsection in the PWM mode in response to the PWM permission signal.

16. The brake fluid pressure control apparatus as claimed in claim 15 wherein the control apparatus further comprises an output section comprising a brake hydraulic circuit comprising the first and second solenoid valves, and an input section for collecting input information to determine the operating parameter and supplying the input information to the process section, the operating parameter being one of a temperature indicative variable representing the temperature of a solenoid of at least one of the solenoid valves, and a pressure indicative variable representing a differential pressure between upstream and downstream sides of at least one of the solenoid valves.

* * * * *